April 3, 1928.
J. B. ANDERSON
1,664,844
SAFETY LANDING AND TAKE-OFF DEVICE FOR AEROPLANES
Filed June 22, 1927
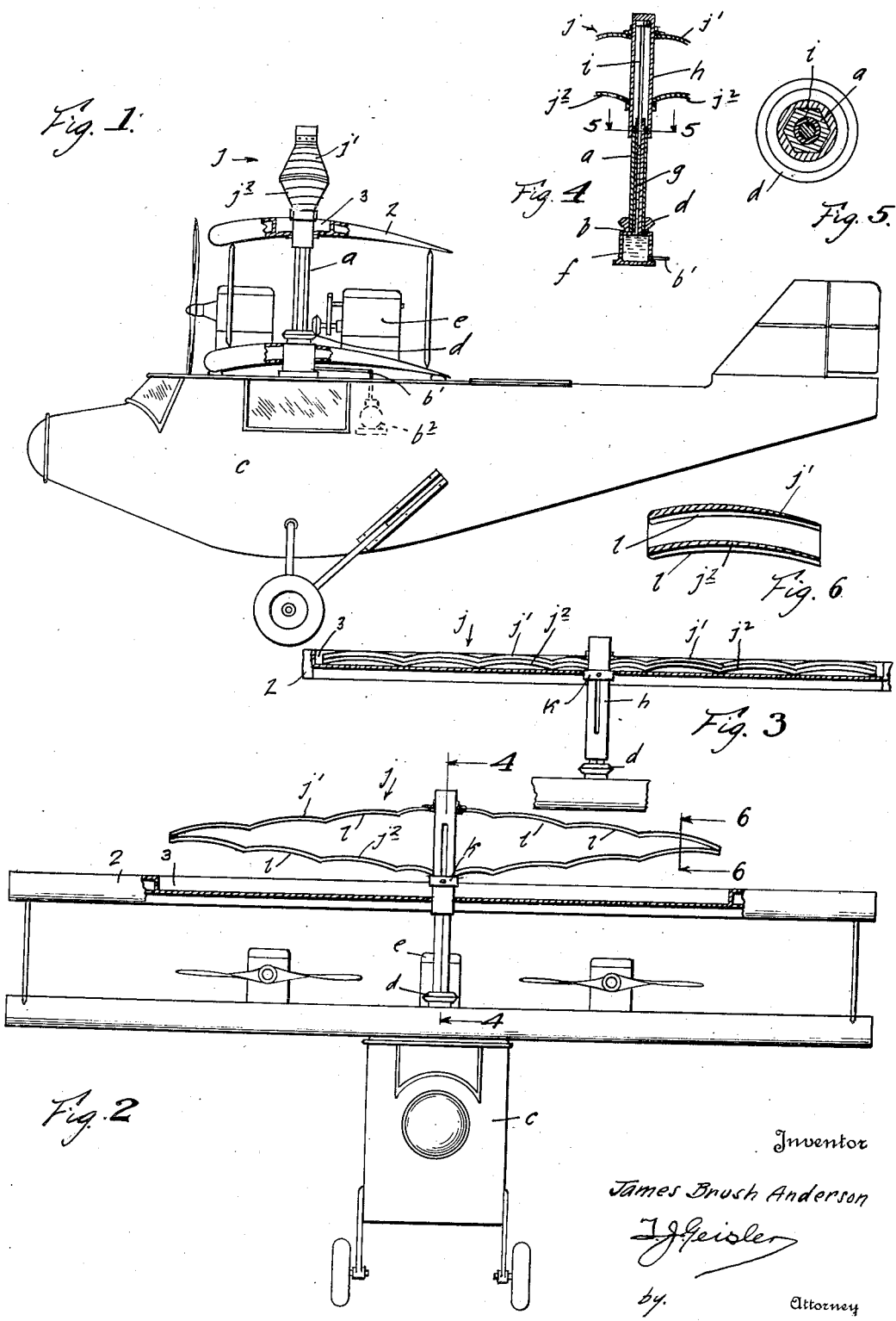

Patented Apr. 3, 1928.

1,664,844

UNITED STATES PATENT OFFICE.

JAMES BRUSH ANDERSON, OF PORTLAND, OREGON.

SAFETY LANDING AND TAKE-OFF DEVICE FOR AEROPLANES.

Application filed June 22, 1927. Serial No. 200,700.

My invention relates to aeroplanes and particularly to safety landing and take-off devices therefor.

At present aeroplanes when rising from the ground make a long run along the field until enough speed is attained to permit the aeroplane to rise on its wings in a long slant. This method requires an especially constructed field of considerable extent and consequently it is impossible for an aeroplane to take-off from the ordinary open country, as when a forced landing has been made.

Further, when taking-off, as the aeroplane rises in a long slant, if the driving propellers should stop because of engine trouble, enough speed will not have been attained to support the aeroplane while descending on a similar long slant, since there is a fixed ratio between the supporting power of the wings, the speed of the aeroplane and the angle of descent, below which the aeroplane tends to fall, damaging the machine and injuring the pilot.

Also when landing, the aeroplane descends with the engines shut off on a long slant which requires the same especially prepared field for landing as for rising, and for this reason a forced landing in ordinary country is seldom successfully made, that is, without at least damaging the machine.

At high altitudes if engine trouble occurs and the aeroplane has lost speed, sufficient speed at which the aeroplane may safely descend is attained by going into a nose dive long enough to attain the required speed for the glide, but at lower elevations such as a hundred feet or less, this expedient is obviously impossible, and a "crash" is the result.

At all times while the aeroplane is in the air, a certain minimum speed must be maintained which is too fast for convenient and effective photographing and mapping of the country beneath.

Therefore, it is desirable that an aeroplane be provided with auxiliary means adapted to raise or lower the aeroplane in a more or less vertical line and adapted also to permit the aeroplane to travel slowly while in the air.

Heretofore, this object has been more or less successfully attained, in so far as vanes or wings rotating in a more or less horizontal plane above the aeroplane have been provided, some of these are driven by the aeroplane engine and others by currents of air created by the driving propellers and the forward movement of the aeroplane; but all have had the same disadvantage, in that the horizontal vanes or wings, commonly known as helicopters, present considerable resistance to the forward movement of the aeroplane as it is driven through the air, thus reducing its speed, and in the case of helicopters driven continuously by the aeroplane engine, a great deal of power is required for driving them, which necessitates either more or larger engines or a still slower speed.

Therefore, the principal object of my invention is to provide horizontally rotating wings which are driven by the aeroplane engine and which may be collapsed and withdrawn, within the surface of the upper plane of an aeroplane, during the flight, when desirable, thus eliminating the frictional resistance of the helicopter or horizontal rotating wings to the atmosphere, whereby the aeroplane may be driven at a high rate of speed and when a landing is to be made or a very slow speed is desirable, the rotatable wings may be projected from within the depression provided for them and driven by either the motor of the driving propeller or an especial motor provided for driving the rotatable wings.

A further object of my invention is to provide means whereby the rotatable and collapsible wings may be easily and conveniently controlled from within the cockpit by the aviator.

A still further object is to provide a simple, efficient and economical landing and take-off device.

These and other incidental objects and the details of construction and operation of my invention will hereinafter be more fully brought out with reference to the accompanying drawings, In which:

Fig. 1 shows diagrammatically a side elevation of a conventional aeroplane and illustrates the horizontally rotating wings in an operative position normal to the longitudinal axis of the plane;

Fig. 2 shows a front elevation of the aeroplane as shown in Fig. 1 and illustrates the horizontally rotating wings in an operative position transverse of the longitudinal axis of the aeroplane and by a portion of the upper plane broken away, discloses the recess or depression in which the rotating wings may be received;

Fig. 3 shows in a fragmentary portion taken from Fig. 2, the revolving wings collapsed within the recess provided in the upper plane;

Fig. 4 shows in a fragmentary section taken on the line 4—4 of Fig. 2, the details of construction of the shaft on which rotating wings are mounted and illustrates the elevating mechanism therefor;

Fig. 5 shows an enlarged section taken on the line 5—5 of Fig. 4; and

Fig. 6 shows a section taken on the line 6—6 of Fig. 2, and illustrates the curvature of the wings.

In the drawings I have shown diagrammatically, a conventional aeroplane, and my invention in combination with the aeroplane comprises a centrally arranged vertical telescopable shaft $a$ journaled as at $b$, directly over the cockpit $c$ of the aeroplane, and driven by suitable gearing $d$, preferably from a special motor $e$ provided for the purpose.

The journal $b$ comprises a reservoir $f$ and the shaft $a$ is provided with a longitudinal bore $g$ opening into the said reservoir. On the upper end of the shaft $a$ is provided a housing $h$, which comprises the telescopable feature of the shaft, provided with a longitudinal centrally arranged piston $i$ fixed in the top end of the housing and extending downwardly, and adapted to move in the central bore $g$ of the shaft. The reservoir $f$ is preferably charged with oil or other suitable fluid and is connected by a conduit $b'$ with a fluid pump $b^2$ arranged within the cockpit of the aeroplane, by which pressure may be created within the reservoir $f$ and by which means the housing $h$ may be moved upwardly by the pressure thus created, and the release of pressure in the reservoir $f$ will allow the housing $h$ to return to its normal position by its own weight and the force of gravity.

To the housing $h$ are fixed the rotatable wings $j$, which comprise upper sections $j'$ and a lower section $j^2$ hinged together at their outer ends.

The inner ends of the sections $j'$ are hinged to the housing $h$ and the inner ends of the sections $j^2$ are hinged to a collar $k$ slidably mounted over the housing $h$.

In the upper surface of the upper plane 2 is provided a depression or recess 3 formed similarly to the shape of the wing sections, but somewhat larger in area, in order that the wing sections may be received within the depression without interference with the edges of the wings.

The recess 3 is also of sufficient depth to receive the wing sections completely within it, thus eliminating the resistance they would otherwise cause to the forward movement of the aeroplane.

The wings $j$ are preferably formed with a number of transverse involutions $l$ and are also curved downwardly transverse of their longitudinal axes similarly to the curvature of the planes (Fig. 6).

Thus, by this construction, when the aeroplane is taking-off from the ground, the housing $h$ to which the wing sections are hingedly connected, will be elevated from the cockpit by the fluid pump $b^2$ and driven by the motor $e$.

The rotating wing sections $j$ then exert a lifting force and the driving propellers which are creating a forward movement, tend to lift the aeroplane at an angle, which is the resultant of the two forces, and the ratio of the two forces and other attendant conditions, which must be taken into consideration, will determine the angle at which the aeroplane will rise from the ground.

After the aeroplane has ascended to a desired elevation and a fast flight is the object, the motor $e$ will be shut off, the wings withdrawn into the recess or depression in the upper plane, by releasing the fluid pressure in the reservoir $f$, which will allow the housing $h$ to settle down on the shaft $a$ and the wing sections $j^2$ which are connected at their other ends to the slidable collar $k$ will be folded on the wing sections $j'$ in substantially flat relation within the recess 3, thus offering no resistance whatever to the forward movement of the aeroplane.

During a flight when a landing is to be made, the housing $h$ will be lifted by pressure created in the reservoir $f$, which will open the wing sections $j'$ and $j^2$ and the forward movement of the aeroplane will rotate the said wing section sufficiently to start the engine $e$ when the ignition is turned on. After which the rotating wing section will exert a lifting force on the aeroplane and the forward speed of the aeroplane may be reduced with safety, thus permitting the aviator to land at a nearly vertical angle, which will require a field of only nominal extent.

Further to travel in a horizontal path at a relatively slow speed, the relative speeds of the driving propellers and the rotating wings will be so proportioned that the resultant angle between the two will be nearly flat, that is, the driving force of the propellers will approach zero as the rotating wings approach the point at which they will be entirely supporting the aeroplane, at which speed mapping, photographing, and reconnaissance may be conveniently carried on.

I claim:

1. In combination with an aeroplane of the type described and provided with a cock pit, auxiliary means for lifting and lowering the aeroplane under conditions mentioned, consisting of a driven vertical shaft carrying horizontally extended, oppositely disposed wings, the said shaft being telescopable, and the wings and their attachment to the shaft adapted to permit the wings to be brought closely together in substantially flat relation.

2. In combination with an aeroplane of the type described and provided with a cock pit, auxiliary means for lifting and lowering the aeroplane under conditions mentioned, consisting of a driven vertical shaft carrying horizontally extended, oppositely disposed wings, the said shaft being telescopable, and the wings and their attachment to the shaft adapted to permit the wings to be brought closely together in substantially flat relation, one of the planes of the aeroplane provided with a depression into which said wings may be drawn and again projected by the lowering and raising of said shaft.

3. In combination with an aeroplane of the type described and provided with a cock pit, auxiliary means for lifting and lowering the aeroplane under conditions mentioned, consisting of a driven vertical shaft carrying horizontally extended, oppositely disposed wings, the said shaft being telescopable, the wings and their attachment to the shaft adapted to permit the wings to be brought closely together in substantially flat relation, one of the planes of the aeroplane provided with a depression into which said wings may be drawn and again projected by the lowering and raising of said shaft, and means for raising and lowering the said shaft, and means for rotating the said shaft, both the latter means controlled from the cock pit of the aeroplane.

4. In combination with an aeroplane of the type described and provided with a cock pit, auxiliary means for lifting and lowering the aeroplane under conditions mentioned, consisting of a driven vertical shaft carrying horizontally extended, oppositely disposed wings, said wings composed of two sections, one imposed over the other, the said shaft being telescopable, and the wings and their attachment to the shaft adapted to permit the wings to be brought closely together in substantially flat relation.

5. In combination with an aeroplane of the type described and provided with a cock pit, auxiliary means for lifting and lowering the aeroplane under conditions mentioned, consisting of a driven vertical shaft carrying horizontally extended, oppositely disposed wings, said wings composed of two sections curved transversely of their longitudinal axis, one imposed over the other, the said shaft being telescopable, and the wings and their attachment to the shaft adapted to permit the wings to be brought closely together in substantially flat relation.

6. In combination with an aeroplane of the type described and provided with a cock pit, auxiliary means for lifting and lowering the aeroplane under conditions mentioned, consisting of a driven vertical shaft carrying horizontally extended, oppositely disposed wings, said wings composed of two sections, one imposed over the other and provided with transverse involutions, the said shaft being telescopable, and the wings and their attachment to the shaft adapted to permit the wings to be brought closely together in substantially flat relation.

7. In combination with an aeroplane of the type described and provided with a cock pit, auxiliary means for lifting and lowering the aeroplane under conditions mentioned, consisting of a driven vertical shaft carrying horizontally extended, oppositely disposed wings, said wings composed of two sections curved transversely of their longitudinal axis, one imposed over the other, and provided with transverse involutions, the said shaft being telescopable, and the wings and their attachment to the shaft adapted to permit the wings to be brought closely together in substantially flat relation.

JAMES BRUSH ANDERSON.